US012527709B2

(12) United States Patent
Dickerson et al.

(10) Patent No.: US 12,527,709 B2
(45) Date of Patent: Jan. 20, 2026

(54) BACK AND SPINE DECOMPRESSION DEVICE

(71) Applicants: Todd Dickerson, Phoenix, AZ (US); Kate Penn Dickerson, Phoenix, AZ (US); Will Shaub Dickerson, Phoenix, AZ (US)

(72) Inventors: Todd Dickerson, Phoenix, AZ (US); Kate Penn Dickerson, Phoenix, AZ (US); Will Shaub Dickerson, Phoenix, AZ (US)

( * ) Notice: Subject to any disclaimer, the term of this patent is extended or adjusted under 35 U.S.C. 154(b) by 541 days.

(21) Appl. No.: 17/890,954

(22) Filed: Aug. 18, 2022

(65) Prior Publication Data

US 2023/0054787 A1 Feb. 23, 2023

Related U.S. Application Data

(60) Provisional application No. 63/234,626, filed on Aug. 18, 2021, provisional application No. 63/296,767, filed on Jan. 5, 2022.

(51) Int. Cl.
*A61H 1/02* (2006.01)

(52) U.S. Cl.
CPC ... *A61H 1/0229* (2013.01); *A61H 2201/0123* (2013.01); *A61H 2201/0192* (2013.01);
(Continued)

(58) Field of Classification Search
CPC ...... A61H 1/02; A61H 1/0292; A61H 1/0296; A61H 2201/1611; A61H 1/0216;
(Continued)

(56) References Cited

U.S. PATENT DOCUMENTS

| | | |
|---|---|---|
| 864,188 A | 8/1907 | Patterson |
| 3,105,489 A | 10/1963 | Zivi |

(Continued)

FOREIGN PATENT DOCUMENTS

| | | |
|---|---|---|
| CN | 108294915 | 11/2019 |
| KR | 20050011600 | 2/2006 |
| KR | 200444415 Y1 | 5/2009 |

OTHER PUBLICATIONS

International Search Report and Written Opinion issued for International Application No. PCT/US22/40791, mailed Feb. 3, 2023, 14 pages.

(Continued)

*Primary Examiner* — Ophelia A Hawthorne
(74) *Attorney, Agent, or Firm* — Sprinkle IP Law Group

(57) ABSTRACT

A spinal decompression system comprising an anchor portion and a working portion operatively coupled to the anchor portion. The anchor portion is adapted to anchor the spinal decompression system to a mechanical ground. The anchor portion comprises an anchor strap. The spinal decompression system comprises a pair of arm supports to support a user's arms in a raised position. The pair of arm supports are operatively coupled to the anchor strap to form a load path from the pair of arm supports to the anchor strap. A load cell is disposed in the load path to sense an applied load applied by the pair of arm supports. The pair of arm supports have an adjustable height to adjust the spinal decompression system to apply a desired load to the users arm to unload at least a portion of the user's bodyweight.

14 Claims, 14 Drawing Sheets

(52) U.S. Cl.
CPC ................ *A61H 2201/1253* (2013.01); *A61H 2201/1635* (2013.01); *A61H 2201/1638* (2013.01); *A61H 2201/5058* (2013.01); *A61H 2203/0406* (2013.01); *A61H 2203/0431* (2013.01)

(58) Field of Classification Search
CPC .... A61H 1/0229; A61H 1/0218; A61H 3/008; A61H 2201/1623; A61H 2203/0487; A61H 2201/0123; A61H 2201/0192; A61H 2201/1253; A61H 2201/1635; A61G 2200/36; A63B 2023/006; A63B 23/0238; A63B 21/1618; A63B 23/12; A61F 5/048
USPC ............................................................ 602/32
See application file for complete search history.

(56) References Cited

U.S. PATENT DOCUMENTS

| | | | | |
|---|---|---|---|---|
| 3,654,922 | A | 4/1972 | Outcalt | |
| 3,695,256 | A | 10/1972 | Brower | |
| 3,900,967 | A | 8/1975 | Bursk | |
| 5,273,502 | A | 12/1993 | Kelsey et al. | |
| 5,667,461 | A * | 9/1997 | Hall | A63B 69/0064 482/54 |
| 6,113,563 | A | 9/2000 | D'Amico | |
| 6,113,564 | A | 9/2000 | Mcguire | |
| 6,662,651 | B1 * | 12/2003 | Roth | A61B 5/224 73/379.02 |
| 6,705,974 | B1 | 3/2004 | Tardif | |
| 6,851,160 | B2 | 2/2005 | Carver | |
| 6,939,269 | B2 | 9/2005 | Makofsky | |
| 6,994,683 | B1 | 2/2006 | Starr | |
| 7,255,666 | B2 | 8/2007 | Cardenas | |
| 7,862,526 | B1 | 1/2011 | Skowron | |
| 8,061,340 | B2 | 11/2011 | Mitchell | |
| 8,197,392 | B2 | 6/2012 | Silverman | |
| 8,221,293 | B2 | 7/2012 | Hoffman | |
| 8,418,426 | B2 | 4/2013 | Rissone | |
| 8,523,743 | B1 | 9/2013 | Miles et al. | |
| 8,657,774 | B1 | 2/2014 | Fisher | |
| 8,814,762 | B2 | 8/2014 | Butler | |
| 9,155,359 | B1 | 10/2015 | Bailey | |
| 9,308,113 | B2 | 4/2016 | Tillotson | |
| 9,345,922 | B2 | 5/2016 | Allison | |
| 9,375,596 | B2 | 6/2016 | Davis | |
| 9,693,922 | B2 * | 7/2017 | Andersson | A61G 7/108 |
| 9,790,731 | B1 | 10/2017 | Bishman | |
| 10,456,315 | B2 | 10/2019 | Dimari | |
| 11,786,430 | B2 * | 10/2023 | Kaikenger | A61G 7/10 5/83.1 |
| 2003/0188751 | A1 * | 10/2003 | Rogozinski | A61H 3/008 128/845 |
| 2011/0282256 | A1 | 11/2011 | Carroll | |
| 2014/0210223 | A1 * | 7/2014 | Lamela | B66C 13/16 294/81.5 |
| 2015/0133277 | A1 | 5/2015 | Alexandrov et al. | |
| 2017/0050069 | A1 * | 2/2017 | Ky | A63B 21/0083 |
| 2023/0166156 | A1 * | 6/2023 | Bar | A63B 21/151 482/8 |

OTHER PUBLICATIONS

PhysioMax Wellness "TRX Back Stretch," retrieved from <https://www.youtube.com/watch?v=IGme9FStIZU&t=1s>, Sep. 1, 2020, 1 page.

Sit and Decompress—The Ultimate Back Stretcher, Lumbar Traction, retrieved from <<https://www.amazon.com/Traction-Equipment/b/ref=dp_bc_aui_C_4?ie=UTF8&node=3776611>>, pages.

Fritz, Julie M. et al., "Exercise Only, Exercise With Mechanical Traction, or Exercise With Over-Door Traction for Patients With Cervical Radiculopathy, With or Without Consideration of Status on a Previously Described Subgrouping Rule: A Randomized Clinical Trial," Journal of Orthopaedic and Sports Physical Therapy, vol. 44, No. 2, Feb. 2014, 15 pages.

International Preliminary Report on Patentability issued for International Application No. PCT/US22/40791, mailed Feb. 13, 2024, 9 pages.

Inversion Table—My Backloop—Better—Safer—Standing Portable Spinal Decompression Device—Treat Herniated Discs, DDD, DJD & Back Pain, Stretch and Traction Lumbar Spine, Back Relief, retrieved from Amazon.com, 8 pages.

Inversion Table—My Backloop—Better—Safer—Standing, retrieved from Amazon.com, 8 pages.

Inversion Table—My Backloop—Better—Safer—Standing Portable Spinal Decompression Device, retrieved from Amazon.com, 8 pages.

"The Backloop Difference," retrieved from <<https://web.archive.org/web/20180821091651/http://mybackloop.com/the-backloop-difference/>>, copyright 2018, N&T HealthEnterprises, LLC, 2 pages.

"MyBackloop," retrieved from <<https://web.archive.org/web/20181022061351/http://mybackloop.com:80/product/mybackloop/>>, copyright 2018, N&T Health Enterprises, LLC, 2 pages.

"Shop MyBackloop," retrieved from <<https://web.archive.org/web/2018082113120/http://mybackloop.com/shop/>>, copyright 2018, N&T Health Enterprises, LLC, 2 pages.

"What Is the BackLoop," retrieved from <<https://web.archive.org/web/20180821075954/http://mybackloop.com/about-the-backloop/>>, copyright 2018, N&T Health Enterprises, LLC, 2 pages.

"How the BackLoop Works," retrieved from <<https://web.archive.org/web/20180821091351/http://mybackloop.com/how-it-works/>>, copyright 2018, N&T Health Enterprises, LLC, 2 pages.

"Setting up the BackLoop," retrieved from <<https://web.archive.org/web/20180821085418/http://mybackloop.com/setting-up-the-backloop/>>, copyright 2018, N&T Health Enterprises, LLC, 2 pages.

"Transcript of Backloop Setup Instructions—Best Decompression Product on the Market," retrieved from <<https://www.youtube.com/watch?v=UWyBpul94p4>>, Jun. 17, 2015, 35 pages.

* cited by examiner

BACK AND SPINE DECOMPRESSION DEVICE

RELATED APPLICATIONS

This application claims priority under 35 U.S.C. 119(e) to U.S. Provisional Patent Application No. 63/234,626, entitled "Back and Spine Decompression Device," filed Aug. 18, 2021, and U.S. Provisional Patent Application No. 63/296,767, entitled "Back and Spine Decompression Device," filed Jan. 5, 2022, each of which is fully incorporated by reference herein.

TECHNICAL FIELD

The present disclosure relates to spinal health. Even more particularly, embodiments relate to spinal and disc decompression.

BACKGROUND

Extended vertical force or repeated vertical force on the human body can lead to spinal compression issues. It is not surprising then that back pain, in one form or another, plagues nearly everyone at some point in their life.

Some back problems result from trauma while others are due to the continued vertical compression of the spine caused by gravity. In fact, the forces of gravity result in roughly a 3% spinal compression, which is why astronauts are 2-3 inches taller in space. Spinal decompression can: increase blood flow to the compressed area, decrease pain, take pressure off of compressed vertebral discs and/or nerves, and allow rehydration of vertebral discs.

Multiple mechanical devices attempt to temporarily decompress the spine. The majority of devices fall into two categories: full spinal decompression and lower back decompression. Many of these devices are designed to operate with the individual being treated in the supine position. The standard force required to decompress the back is over 50% of the individual's body weight to overcome frictional forces of the device, including the frictional forces between the individual and the surface on which the individual is lying. To achieve this force, the individual being treated often has to actively apply a force during treatment. Some individuals, however, lack the strength to achieve or sustain the force necessary for treatment. Moreover, in some individuals, having to produce the recompression force can be counterproductive and delay recovery.

Full spinal decompression is often accomplished with very expensive in-office machinery, nearly always with the patient in the supine position. The standard force required to decompress the back is a minimum of 50% of body weight due to frictional forces needing to be overcome in a supine position. These machines can be extremely complicated and expensive, resulting in relatively expensive treatment sessions.

Many of the lower back or lumbar decompression devices are cost effective enough for at-home use. Many of these devices are designed to operate with the individual in the supine position. Again, excessive force (at least 50% of body weight) is needed to overcome surface friction between the individual's body and floor or table to initiate spinal decompression.

Moreover, some devices have contraindications. For example, one common at home device consists of an inversion table where the patient head is below the heart. There are multiple significant medical contraindications to this type of apparatus.

Therefore, there is a need for an improved spinal decompression device.

SUMMARY

As discussed above, spinal decompression techniques often require complex equipment or are designed to operate with the user in a supine position. These techniques often require the user to actively assert an excessive force to initiate spinal decompression.

The present disclosure, on the other hand, provides back and spine decompression systems and techniques that can decompress the entire back while the user is in a seated or other upright position using a gentler force. In addition to spinal decompression, embodiments can stretch the long muscles of the back, decreasing tension on the spinal system. Moreover, some embodiments can be deployed in almost any environment, including at spinal professional offices, physical therapy offices or at home.

One embodiment of a spinal decompression system comprises an anchor portion to anchor the spinal decompression system to a mechanical ground, such as a door or other support structure. The spinal decompression system further comprises a working portion adapted to lift a user's arms and support the user's arms in a raised or elevated position while the user rests in a relaxed upright position with a portion of their body weight supported by the spinal decompression system.

The working portion is operably coupled to the anchor portion such that the spinal decompression device comprises a load path from the working portion to the anchor portion. Even more particularly, the working portion is suspended from the anchor portion in some embodiments. A load cell is disposed in the load path to sense an applied load applied by the working portion. As will be appreciated, at least a portion of the applied load corresponds to the unloading load applied by the working portion of the spinal decompression device.

In one embodiment, a controller is coupled to the load cell and receives a signal output by the load cell that corresponds to the applied load. The controller is configured to process the signal to determine the applied load or the unloading load. In one embodiment, the controller applies a tare function or other function to zero-out the portion of the applied load that does not correspond to the unloading loading. For example, the controller can apply a tare function or other function to zero-out the unladen weight of the working portion.

In an even more particular embodiment, the anchor portion comprises an anchor strap and an anchor. In one embodiment, the anchor strap is a fixed length strap once installed. In another embodiment, the anchor strap has an adjustable length to adjust the height of the working portion and, particularly, the working end portions of the arm supports. In some embodiments, the spinal decompression system is mountable on a door, preferably without modification of the door. The anchor can take various forms. In one embodiment, for example, the anchor is a door wedge that is placed under the door to support the door during use. In another embodiment, the anchor is another type of anchor that prevents the anchor strap from slipping through the gap between the door and door frame.

According to one aspect of the present disclosure, the working portion comprises a pair of arm supports to support a user's arms in a raised position. The pair of arm supports are operatively coupled to the anchor strap to form a load path from the pair of arm supports to the anchor strap. As discussed above, a load cell may be disposed in the load path to sense an applied load applied by the pair of arm supports. The height of the arm supports is adjustable to adjust the unloading load.

According to another aspect of the present disclosure, the arm supports comprise working end portions adapted to lift the user's arms by the upper arms, forearms, wrists, or hands. The working end portions may comprise, for example, arm slings to receive and support the upper or lower arms, cuffs, handles or other suitable ends.

According to yet another aspect of the present disclosure, the arm supports comprise working straps that are suspended from, for example, an attachment point. In some embodiments, the working straps are adjustable length straps that allow the height of the working end portions to be easily adjusted.

According to yet another aspect of the present disclosure the working portion of the spinal decompression device comprises a crossbar coupled to the pair of arm supports at spaced locations along the crossbar. In some embodiments, for example, the arm supports are suspended from the crossbar. In even more particular embodiments, the arm supports comprise fixed length or variable length working straps that extend between the crossbar and the working end portions of the arm supports. In other embodiments, the arm slings, cuffs, handles or other working end portion of the arm supports are coupled to the crossbar without (or with a minimum) working strap.

According to another aspect of the present disclosure, the spinal decompression system comprises a harness to support the crossbar. In one embodiment, the harness is disposed between the crossbar and load cell in the load path. The harness may be a fixed length harness. In other embodiments, the harness is adjustable to adjust the height of the crossbar and hence the arm supports.

According to one aspect of the present disclosure, a spinal decompression system comprises an anchor portion to anchor the spinal decompression system to a mechanical ground, the anchor portion comprising an anchor and an adjustable length anchor strap coupled to the anchor. The system further comprises a crossbar operatively coupled to the adjustable length anchor strap and a pair of arm supports suspended from the crossbar. The arm supports may comprise, for example, an arm sling, cuff or a handle in some embodiments. A load cell configured to sense an applied load applied by the pair of arm supports. The adjustable length anchor strap is adjustable to adjust the applied load. According to one embodiment, a controller is coupled to the load cell. The controller is adapted to convert a signal output by the load cell to an indication of unloading load applied by the spinal decompression device on a user's arms.

Other aspects include methods for spinal decompression using a spinal decompression system. In one embodiment, the method comprises mounting a spinal decompression system to a support structure. The method further includes using the spinal decompression system to apply an unloading load to the user's arms to unload a portion of the user's bodyweight. The arm supports support the user's arms in a raised position while the user is, for example, in a relaxed, generally upright position (such as a sitting position). The method further comprises adjusting the spinal decompression system to apply a desired unloading load to the user's arms and continuing to support the user's arms using the desired unloading load for a prescribed period of time. In some embodiments, the desired unloading load is 10%-30% of the user's body weight.

According to one aspect of the present disclosure, a method for spinal decompression can include processing a signal output by the load cell to determine an unloading load applied by the spinal decompression device and outputting an indication of the unloading load. The user undergoing treatment or a person providing treatment can continue to adjust the spinal decompression system until the load indicated by the controller (e.g., on an LCD screen or other output device) matches the desired unloading load.

BRIEF DESCRIPTION OF THE DRAWINGS

For a better understanding of these and other objects of the invention, reference will be made to the following detailed description of the invention which is to be read in association with the accompanying drawings, wherein.

DETAILED DESCRIPTION

Figure 1A:
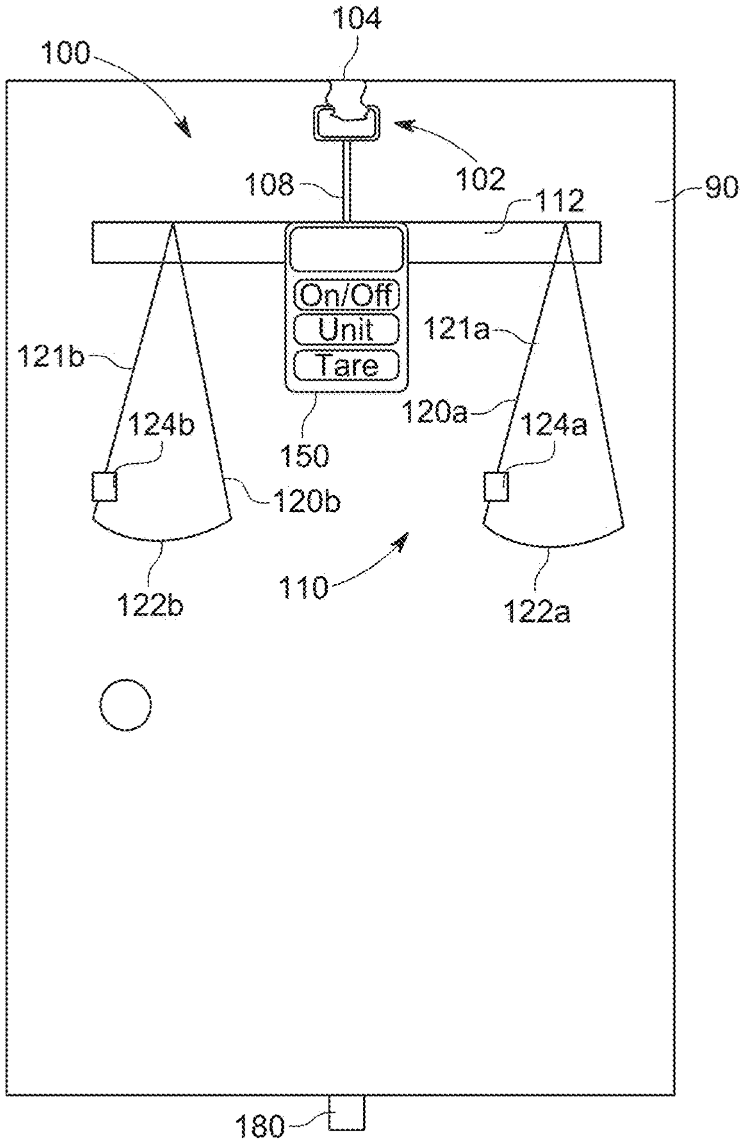
FIG. 1A is a diagrammatic representation of a front view of one embodiment of a spinal decompression system mounted on a door.

Spinal decompression systems and related methods and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide spinal decompression systems that can decompress the entire back using a gentler force—for example, in some embodiments, the force applied can be significantly decreased from the typical minimum of 50% of body weight. In addition to spinal decompression, this device stretches the long muscles of the back, decreasing tension on the spinal system. Moreover, embodiments can be deployed in almost any environment, including at spinal professional offices, physical therapy offices or at home. Embodiments of the spinal decompression system can be used to reduce vertical pressure on the spine and discs for a desired amount of time, say 15 minutes or less a day in some embodiments. Embodiments can provide a load that is directly measurable and adjustable based on individual user needs. According to one embodiment, the spinal decompression system is set up to unload 15% of total body weight on the right side and an additional 15% on the left side for up to 4 minutes, allowing disc rehydration due to spinal decompression. It should be noted that 15% of total body weight and 4 minutes are provided by way of example and other weights and time periods can be used.

Embodiments provide a number of advantages. Various embodiments provide affordable at-home total spinal decompression without inversion and associated medical risks. Embodiments can provide total spinal decompression without needing sustained, active force application by the user. Decompression systems as described herein may be significantly less expensive than full decompression machines. Embodiments of decompression systems described herein can be fully adjustable to patient needs. Embodiments can provide measurable and adjustable decompression forces. Embodiments may decrease frequency for office healthcare visits due to improved health, decreased pain due to spinal decompression. Embodiments may decrease health and medical expenditures by allowing decompression with fewer medical office visits or between regular office visits.

One embodiment of a spinal decompression device comprises a pair of arm supports that are mountable to a stationary support structure. Some embodiments of spinal decompression devices described herein, for example, are door mountable without modifying the door. Each arm support goes to a respective arm of the user being treated. In one embodiment, the arm supports are adapted to raise the user's arms (e.g., a patient's arms) by the user's upper arms. In another embodiment, the arm supports are adapted to raise the user's arms by the user's lower arms, such as by the wrists or another portion of the user's lower arms. The arm supports are operatively coupled to a load measuring device. The load measuring device is adapted to measure a load applied by the arm supports.

In one embodiment, the arm supports are operatively coupled to a load cell—by way of example, but not limitation, a resistive load cell or capacitive load cell—that converts an applied load acting on the load cell to an electronic signal (e.g., voltage change, current change, frequency change). A controller converts the electronic signal to a load in pounds, kilograms, Newtons or other measurement units and outputs an indication of the determined load to a display.

As will be appreciated, a load cell may be located at any point in a load path suitable to produce an electrical signal corresponding to the unloading load applied to the user's arms. In some embodiments, multiple load cells are used—for example, one load cell to output an electrical signal corresponding to the unloading load applied to one arm and another load cell to output an electrical signal corresponding to the unloading load in the other arm. Separate controllers may be provided for each arm, or a single controller may receive and process the signals from the multiple load cells.

The arm supports have an adjustable height. By adjusting the height of the arm supports, and more particularly, the height of the working end portions of the arm supports, the user's arms can be raised or lowered, thus adjusting the unloading force applied by the arm supports to the user's arms. In some embodiments, the height of the arm supports is adjusted using adjustable length working straps of the arm supports, an adjustable length anchor strap, or an adjustable harness. The anchor strap, working straps or harness can be adjusted so that a desired amount of unloading force is provided to the user's arms.

Embodiments discussed below are described primarily with respect to a door mounted device. However, other embodiments may mount to other mechanical grounds. By way of example, but not limitation, a spinal decompression device may be mounted to a wall, a ceiling bracket, or other mechanical ground. Furthermore, while embodiments discussed below are described primarily with respect to embodiments that have arm slings to lift a user's upper arms, other embodiments may lift the user's arms from the wrists, forearms, or hands.

Figure 1B:
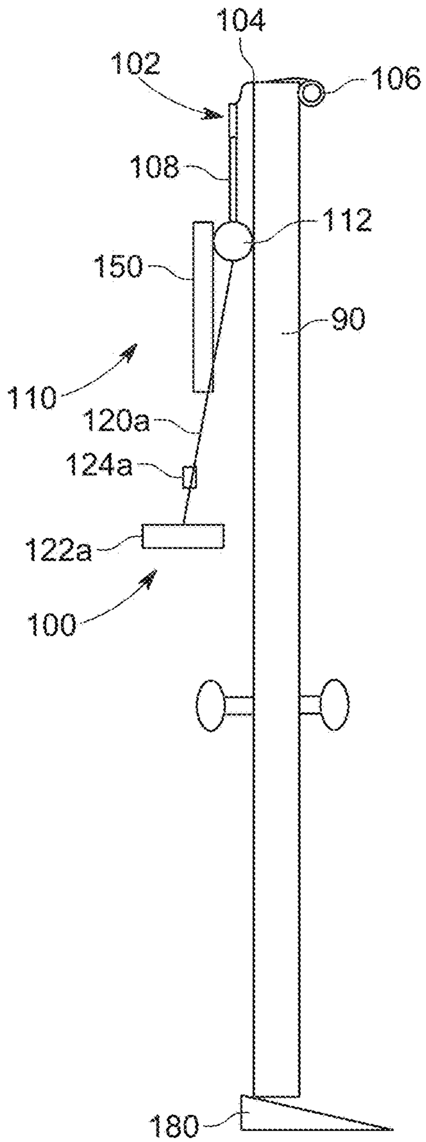
FIG. 1B is a diagrammatic representation of a side view of one embodiment of a spinal decompression system mounted to a door.

FIG. 1A is a diagrammatic representation of a front view of a door 90 having one embodiment of a spinal decompression device 100 mounted thereon. FIG. 1B is a diagrammatic representation of a side view of door 90 having spinal decompression device 100 mounted thereon according to one embodiment.

In the embodiment illustrated, spinal decompression device 100 includes a first portion 102 (e.g., an anchor portion), a second portion 110 (e.g., a working portion), and a load measuring device 150 operatively coupled to the first portion 102 and second portion 110.

First portion 102 is adapted to anchor to a mechanical ground, such as a stationary structure (e.g., a door, a pull up bar, a wall or ceiling mounted bracket or other structure that remains stationary during use of decompression device 100 for treatment). In the embodiment of FIG. 1B, first portion 102 comprises an anchor strap (e.g., a webbing strap) operatively coupled to an anchor 106. Strap 104 is adapted to fit between the door and the door frame. Anchor 106 is provided to prevent the door anchor from slipping through the gap between the door and the door frame when force is applied to spinal decompression device 100 during treatment. According to one embodiment, anchor 106 comprises a rod, disk or other member that is too large to pass through the gap between the door and door frame when spinal decompression device 100 is in use. Thus, anchor strap 104 and anchor 106 act as a door hook. First portion 102 is coupled to other portions of the device by linking member 108, such as a pin, a bar, hook, or other suitable structure or combination of structures.

Second portion 110 provides a suspension system to suspend the user's arms and is operatively coupled to first portion 102. In the illustrated embodiment, second portion 110 includes arm supports 120$a$, 120$b$ connected to a horizontal crossbar 112 at spaced-apart locations. Crossbar 112 is operatively coupled to the first portion 102. According to one embodiment, crossbar 112 is operatively coupled to the first portion 102 by a biasing member, such as a spring or other mechanism, that allows crossbar 112 to displace relative to the first portion 102 from an unloaded position to a range of loaded positions when load is applied to arm supports 120*a*, 120*b* and biases crossbar 112 back to the unloaded position when load is removed from arm supports 120*a*, 120*b*. Even more particularly, in one embodiment, crossbar 112 is operatively coupled to linking member 108 by a biasing member and moves relative to linking member 108 from the unloaded position to a loaded position.

In the illustrated embodiment, arm supports 120*a*, 120*b* comprise working straps 121*a*, 121*b*, respective arm slings 122*a*, 122*b* (e.g., padded straps that cup and support the user's arms), and length adjustment mechanisms 124*a*, 124*b*. The pair of working straps 121*a*, 121*b* (e.g., lengths of material, such as rope, webbing, or other materials), run from crossbar 112 to the working end portions of arm supports 120*a*, 120*b*. The working end portions of arm supports 120*a*, 120*b* are adapted to support a user's arms during treatment. More particularly, the working end portions of the arm supports may comprise slings, cuffs, handles, or other mechanisms such that the arm supports can lift the user's arms from the upper arms, forearms, wrists, or hands. In the embodiment illustrated, the working end portions of arm supports 120*a*, 120*b* comprise arm slings 122*a*, 122*b* adapted to receive and support the user's upper arms.

Spinal decompression system 100 forms a load path from arm supports 120*a*, 120*b* to anchor strap 104 and further to the mechanical ground. When a user rests their arms in respective arm slings 122*a*, 122*b*, the weight of the user's arm causes a displacement of second portion 110 relative to the first portion 102—for example, causes displacement of crossbar 112 relative to linking member 108. Load measuring device 150 comprises a load cell disposed in the load path between arm supports 120*a*, 120*b* and anchor strap 204 and measures an applied load. For example, in one embodiment, load measuring device 150 includes strain gauges or other sensors to measure a load based on the displacement of crossbar 112 relative to the first portion 102. The output from the load cell is processed accordingly to output an indication of the unloading force applied to the user's arms.

As will be appreciated, a portion of the applied load sensed by the load cell of some embodiments may be due to the unladen weight of second portion 110. In some embodiments, a portion of the sensed applied load is zeroed-out or otherwise accounted for so that the load caused by the unladen weight of the second portion 110 or other loads that are not applied to supporting the user's arms are not included in the indicated unloading load.

Length adjustment mechanisms 124*a*, 124*b* serve as height adjustment mechanisms that allow the height of the working end portions of arm supports 120*a*, 120*b* to be adjusted. The lengths of working straps 121*a*, 121*b* can be selected to achieve a desired unloading force on the user's arms. As discussed above, each working strap 121*a*, 121*b* includes a length adjustment mechanism 124*a*, 124*b* to allow the length of each working strap 121*a*, 121*b* to be adjusted. The length adjustment mechanisms 124*a*, 124*b* may be located at any suitable location. Examples of length adjustment mechanisms include, but are not limited to quick release cam buckles, ratchets or other strap length adjustment mechanisms.

A support 180, such as a wedge or other support, may be placed under door 90 to help support door 90 during use.

Figure 2:
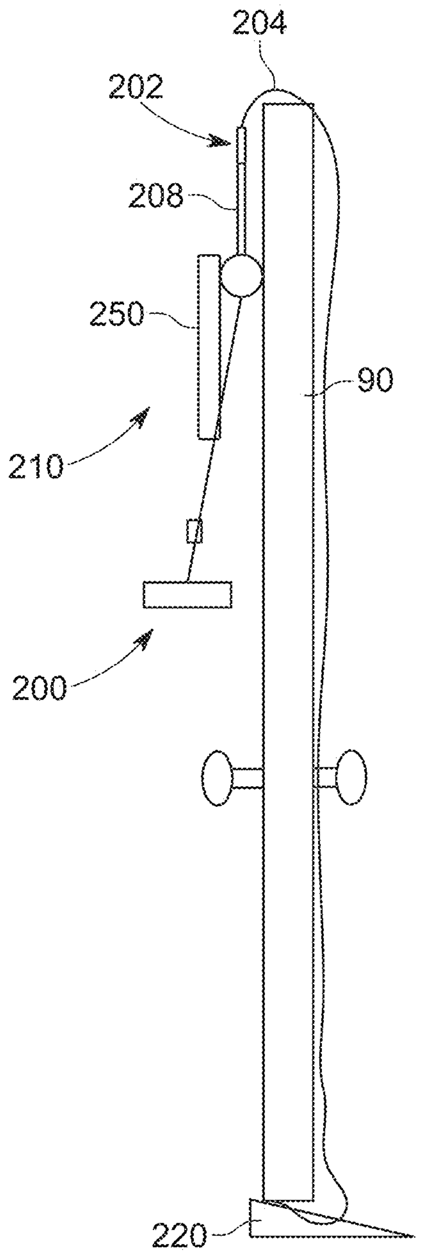
FIG. 2 is a diagrammatic representation of a side view of another embodiment of a spinal decompression system mounted on a door.

FIG. 2 illustrates another embodiment of a spinal decompression device 200 having a first portion 202, second portion 210, and load measuring device 250. First portion 202 and second portion 210 are operatively coupled at linking member 208. Linking member 208, second portion 210, and load measuring device 250 may, in some embodiments, be similar to linking member 108, second portion 110, and load measuring device 150 of FIG. 1. In the embodiment of FIG. 2, however, the first portion 202 includes an anchor strap 204 that is connected to a door support wedge 220. In such an embodiment, the door support wedge 220 acts both to support the door and as an anchor for spinal decompression device 200.

Other forms of door hooks or anchoring arrangements may also be used such as, but not limited to, a metal hook that hooks over door 90, an anchor strap that is securable to a stationary bar or bracket using a loop, clip, tying or other connection mechanism. Moreover, in some embodiments, anchor strap 104 or anchor strap 204 is an adjustable length anchor strap that can be adjusted to raise or lower the arm supports.

Figure 3:
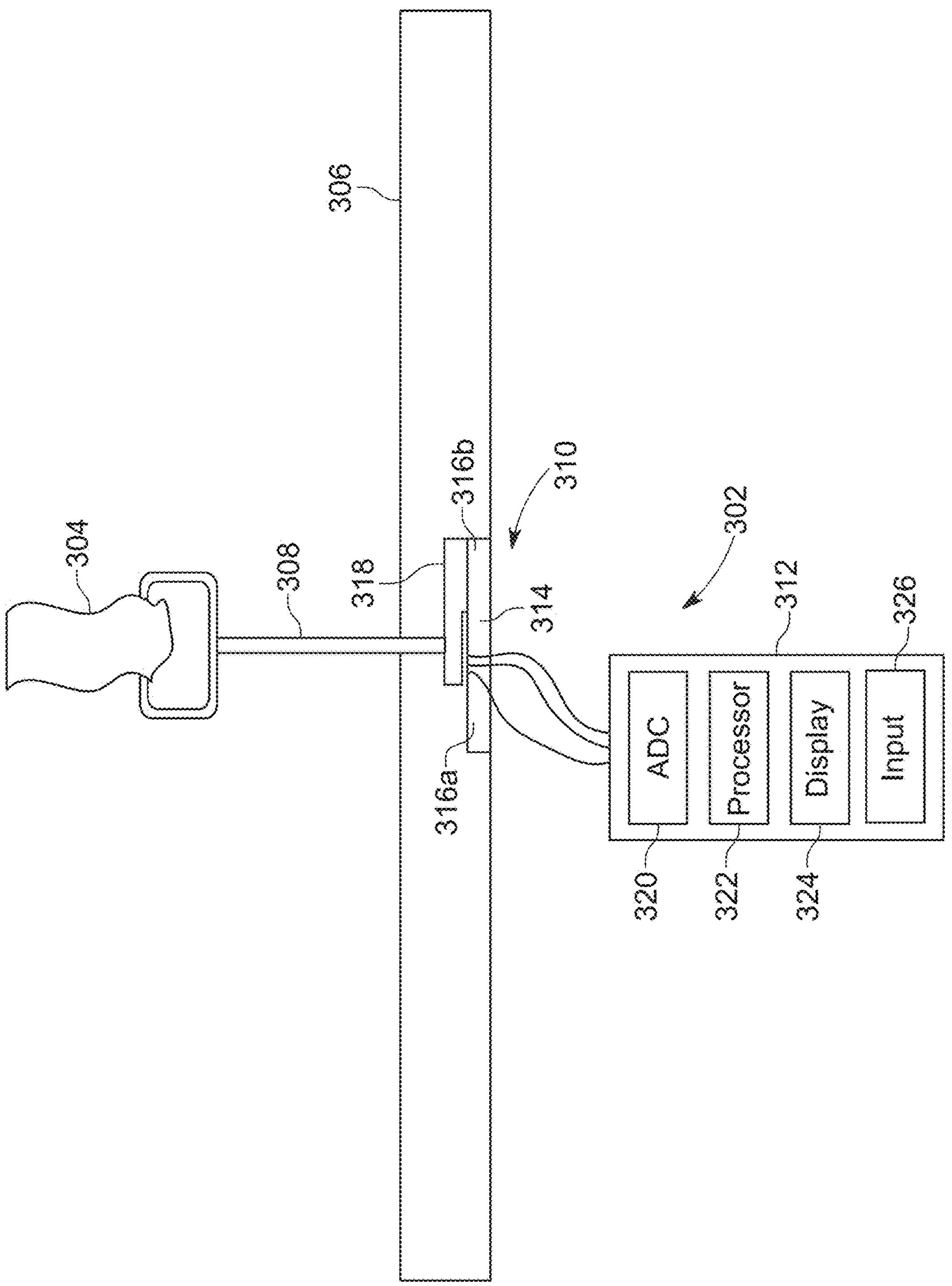
FIG. 3 is a diagrammatic representation of one embodiment of a mechanism for determining the unloading load applied to a user's arms.

FIG. 3 is a diagrammatic representation of one embodiment of a mechanism for measuring the unloading load applied to a user's arms. In the embodiment of FIG. 3, a load measuring device 302, which is one non-limiting embodiment of load measuring device 150 or load measuring device 250, is operatively coupled to an anchor strap 304 and a crossbar 306 of an arm suspension system.

Load measuring device 302 comprises a load cell 310 (e.g., a transducer that outputs an electrical signal based on load) and a controller 312. Load cell 310 comprises a spring element and strain sensors. The spring element elastically deforms under load, but then returns to a starting (unloaded position) when the load is removed. The strain gauges convert the load acting on the load cell to an electronic signal. Controller 312 processes the output signal of load cell 310 to determine the applied load on the load sensor or the load applied by the arm supports on the user's arms and outputs an indication of the determined load.

Load cell 310 is disposed in the load path from crossbar 306 to anchor strap 304 and outputs an electrical signal corresponding to the load applied by crossbar 306 to load cell 310. In the embodiment illustrated, load cell 310 is a bending beam load cell disposed in the interior of crossbar 306. As such, load cell 310 comprises a bending beam 314 that acts as a spring element. The bending beam 314 may be spaced from the interior surface of crossbar 306 by spacers (not illustrated). A first end 316*a* of a bending beam 314 is connected to crossbar 306 and the second end 316*b* of bending beam 314 is free from crossbar 306 but is connected to linking member 308. In the illustrated embodiment, linking member 308 is connected to the second end 316*b*—that is, the free end—of bending beam 314 by an offset member 318 so that load cell 310 bends when load is applied. As load is applied to crossbar 306 by the arm supports, crossbar 306 displaces relative to linking member 308 from an unladen position (the position when a user's arms are not being supported) to a laden position. The bending beam 314 acts as a spring member and will bend from its starting position (corresponding to the unladen position) to a laden position. Strain gauges placed on the spring element—for example, as a bridge circuit (e.g., a Wheatstone bridge) or in another arrangement—output an electrical signal based on the amount of deformation (bend) in the spring element.

Controller 312, according to one embodiment, includes an analog to digital convertor 320 to convert the signal from the strain gauge to a digital signal, and a processor 322 to process the digital signal to determine a corresponding load and output an indication of the load (e.g., a load in kg or lbs.)

on a display device 324. Controller 312 may include inputs 326 such as power on/off, units (e.g., kg or lbs.), or tare. As will be appreciated the tare function can reset the load measuring device's output load to zero. For example, the tare function can be used to zero-out the weight of the crossbar, arm supports or other loads when the arm supports are unladen so that the indicated unloading load does not include the weight of the crossbar and the arm supports. Controller 312 also comprises or is connectable to a power source.

Figure 4A:
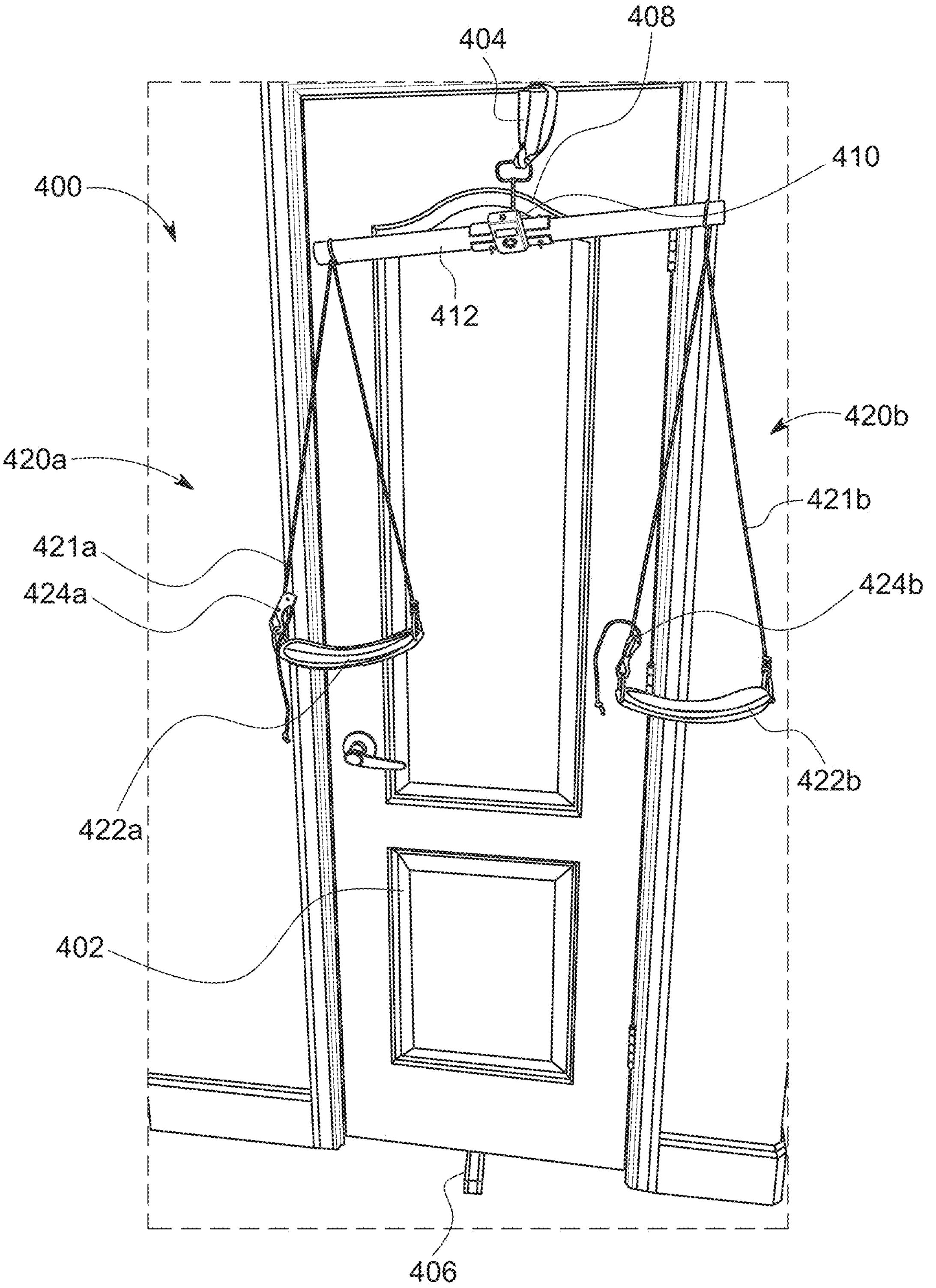
FIG. 4A illustrates another embodiment of a spinal decompression system mounted on a door.
Figure 4B:
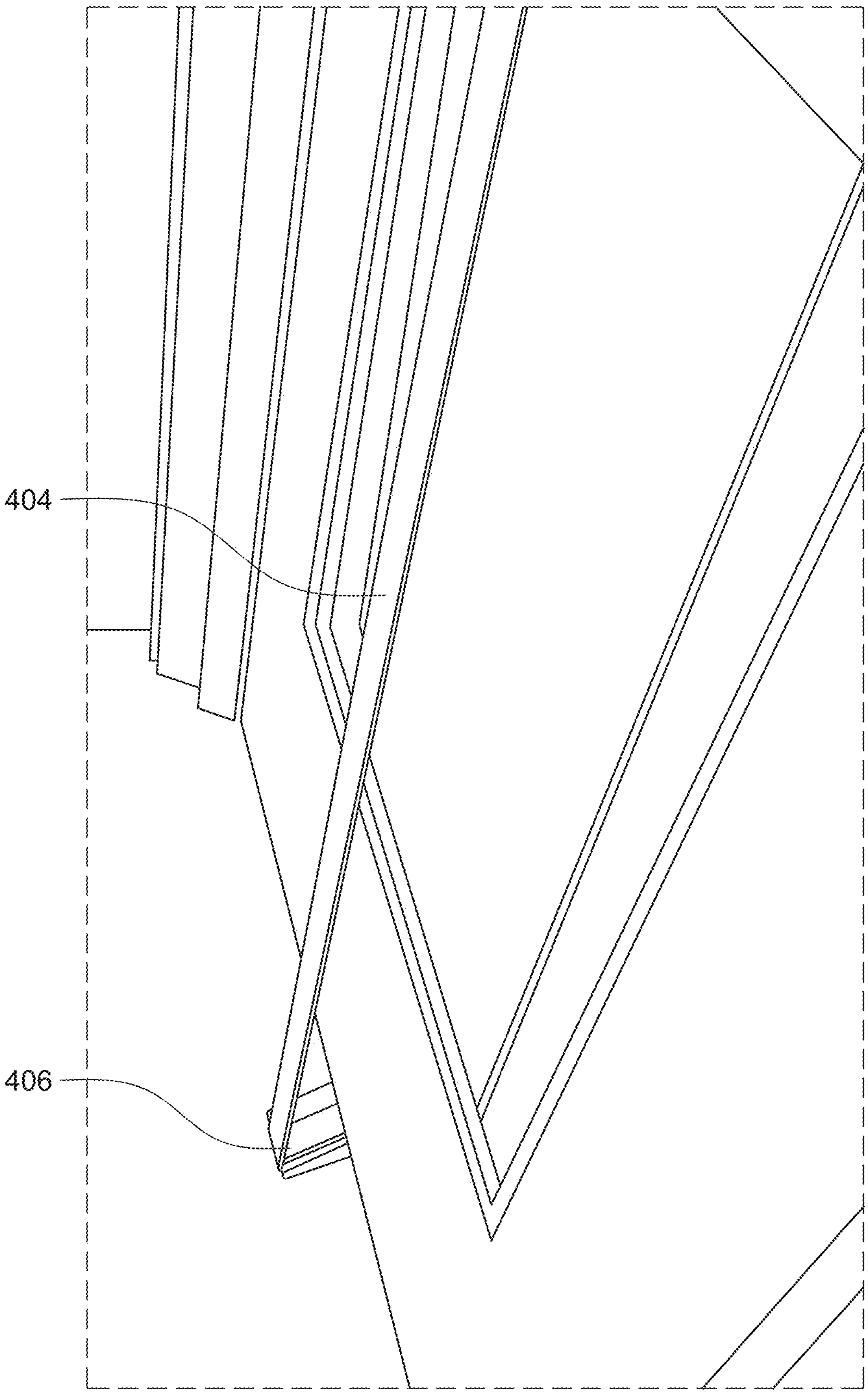
FIG. 4B illustrates one embodiment of an anchor strap attached to a support wedge.
Figure 4C:
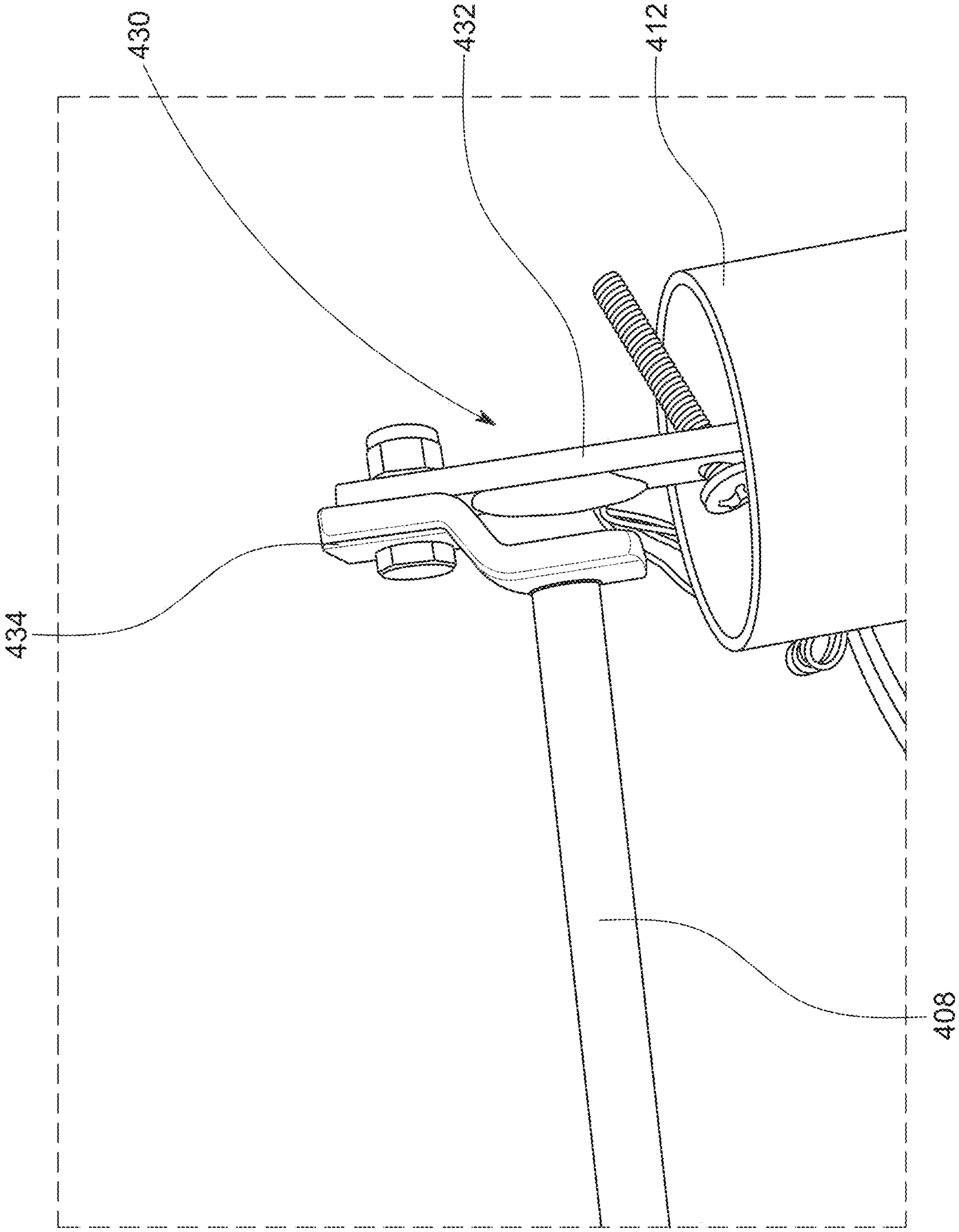
FIG. 4C illustrates one embodiment of a partially disassembled spinal decompression device.
Figure 4D:
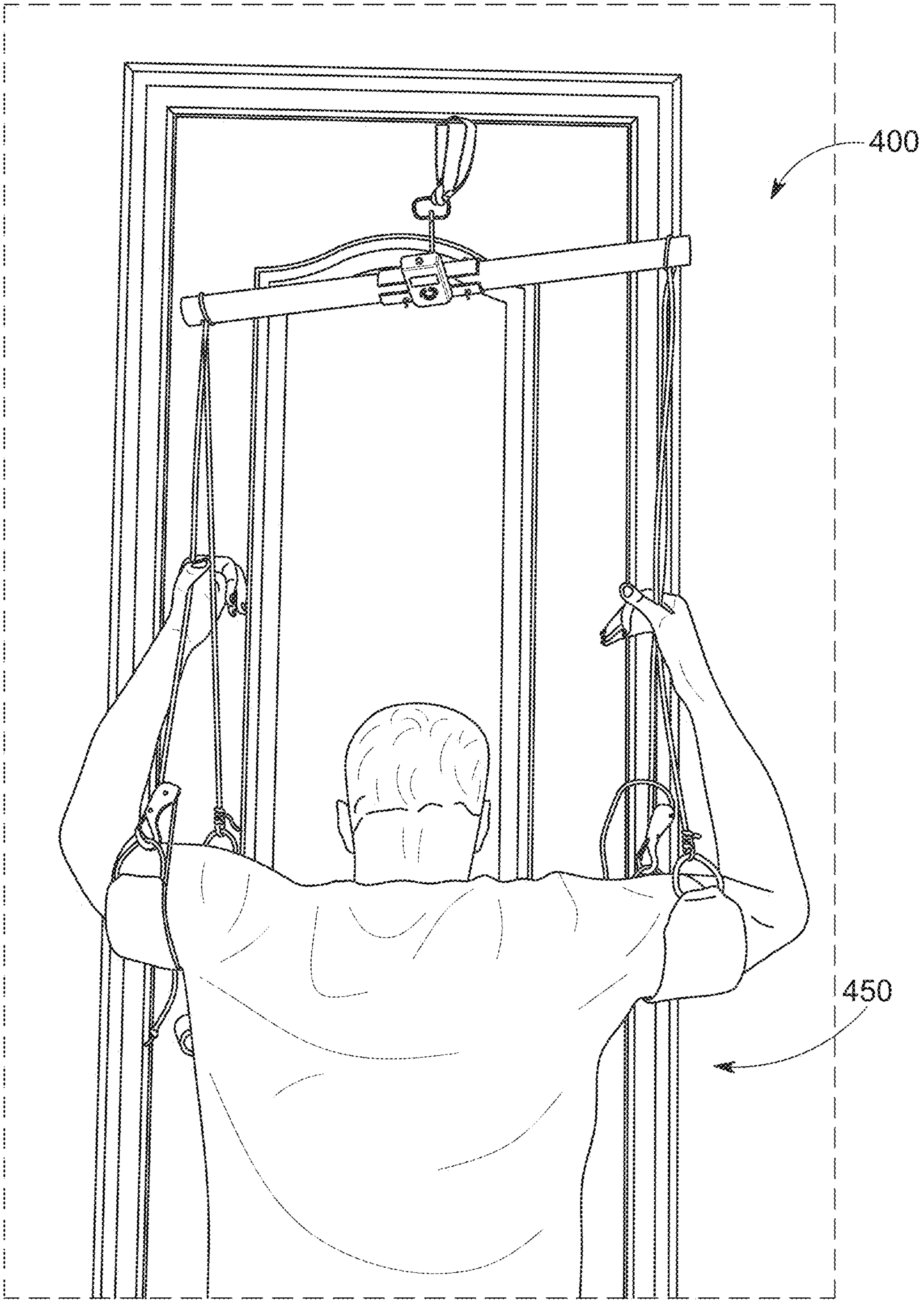
FIG. 4D illustrates one embodiment of a spinal decompression system in use.

FIG. 4A illustrates a front view of one embodiment of a spinal decompression device 400 mounted on a door 402. FIG. 4B illustrates a second view of spinal decompression device 400. FIG. 4C illustrates one embodiment of a crossbar opened to expose a load cell. FIG. 4D illustrates one embodiment of spinal decompression device 400 in use.

Spinal decompression device 400 comprises an anchor portion, a working portion, and a load measuring device. The anchor portion comprises an anchor strap 404 coupled at one end to an anchor 406 and to linking member 408 at the distal end. As illustrated in FIG. 4B, anchor 406 is a door wedge and anchor strap 404 runs down the back of the door to connect to anchor 406 at the base of the door. While illustrated as a fixed length strap, anchor strap 404, in other embodiments, is an adjustable length anchor strap. Furthermore, in other embodiments, the anchor portion may be adapted to anchor the spinal decompression device to a pull up bar, a wall, a ceiling mounted bracket or other mechanical ground.

The working portion includes a horizontal crossbar 412 from which a pair of adjustable height arm supports 420*a*, 420*b* are suspended. In the illustrated embodiment, arm supports 420*a*, 420*b* comprise working straps 421*a*, 421*b* that run from crossbar 412 to the working end portions of arm supports 420*a*, 420*b*. The working end portions of arm supports 420*a*, 420*b* are adapted to support a user's arms during treatment. More particularly, the working end portions of the arm supports may comprise slings, cuffs, handles, or other mechanisms such that the arm supports can lift the user's arms from the upper arms, forearms, wrists, or hands. In the embodiment illustrated, the working end portions of arm supports 420*a*, 420*b* comprise arm slings 422*a*, 422*b* adapted to receive and support the user's upper arms.

Working straps 421*a*, 421*b* are adjustable length straps. As such, spinal decompression device 400 includes length adjustment mechanisms 424*a*, 424*b*. In the embodiment illustrated, the length adjustment mechanisms 424*a*, 424*b* comprise hook and ratchet mechanisms. Other embodiments may use other length adjustment mechanisms.

As discussed, anchor strap 404 is coupled to linking member 408. Linking member 408 extends into crossbar 412 and is connected to a load cell of load measuring device 410. Turning to FIG. 4C, load measuring device 410 includes a bending beam load cell 430 disposed in the interior of crossbar 412 and in the load path from crossbar 412 (and hence the arm supports suspended from crossbar 412) to anchor strap 404. While detached from crossbar 412 in FIG. 4C for easier viewing, the spring element 432 of load cell 430 is, in practice, fixed at one end to the interior of crossbar 412. The other end of spring element 432 is free to bend away from crossbar 412 but is connected to linking member 408 by an offset member 434. This allows the axis of linking member 408 to be more centered than the free end of spring element 432 with respect to crossbar 412 while still allowing the applied load to induce bend in spring element 432. Strain gauges placed on spring element 432—for example, as a bridge circuit (e.g., a Wheatstone bridge) or in another arrangement—output an electrical signal based on the amount of deformation (bend) in spring element 432.

When user 450 rests their arms in respective arm slings, the weight of the user's arms causes a displacement of crossbar 412 relative to linking member 408, thereby causing spring element 432 to bend. Load measuring device 410 senses the applied load on spring element 432 and outputs an indication of an unloading load. In some embodiments, load measuring device 410 zeros-out the weight of the crossbar, arm supports and other loads that present when the arm supports are unladen so that these loads are not included in the indicated unloading load.

The length of working straps 421*a*, 421*b* can be adjusted to adjust the lifting load on the user's arms.

Figure 5A:
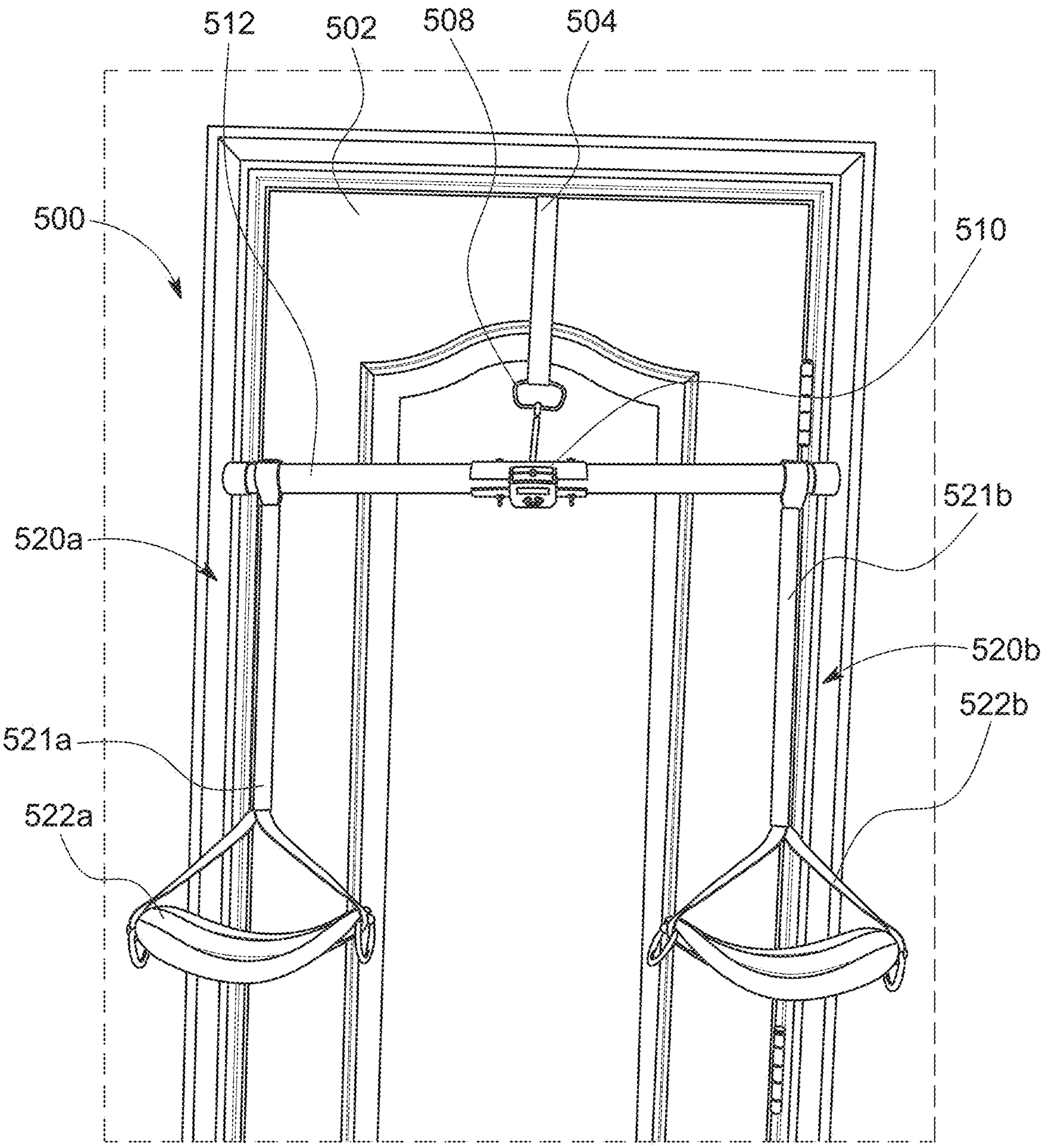
FIG. 5A illustrates a front view of another embodiment of a spinal decompression system.
Figure 5B:
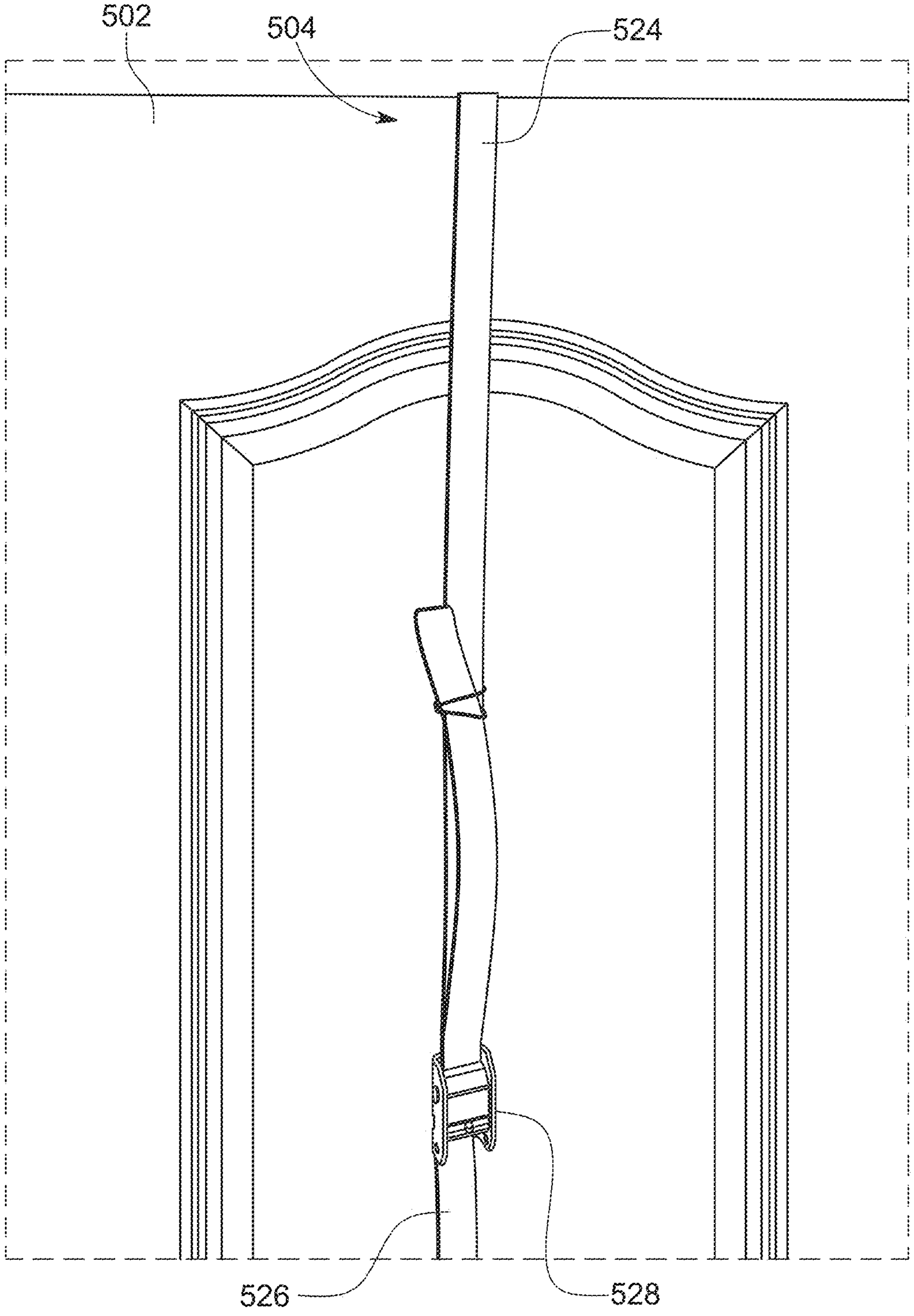
FIG. 5B illustrates one embodiment of an adjustable anchor strap.
Figure 5C:
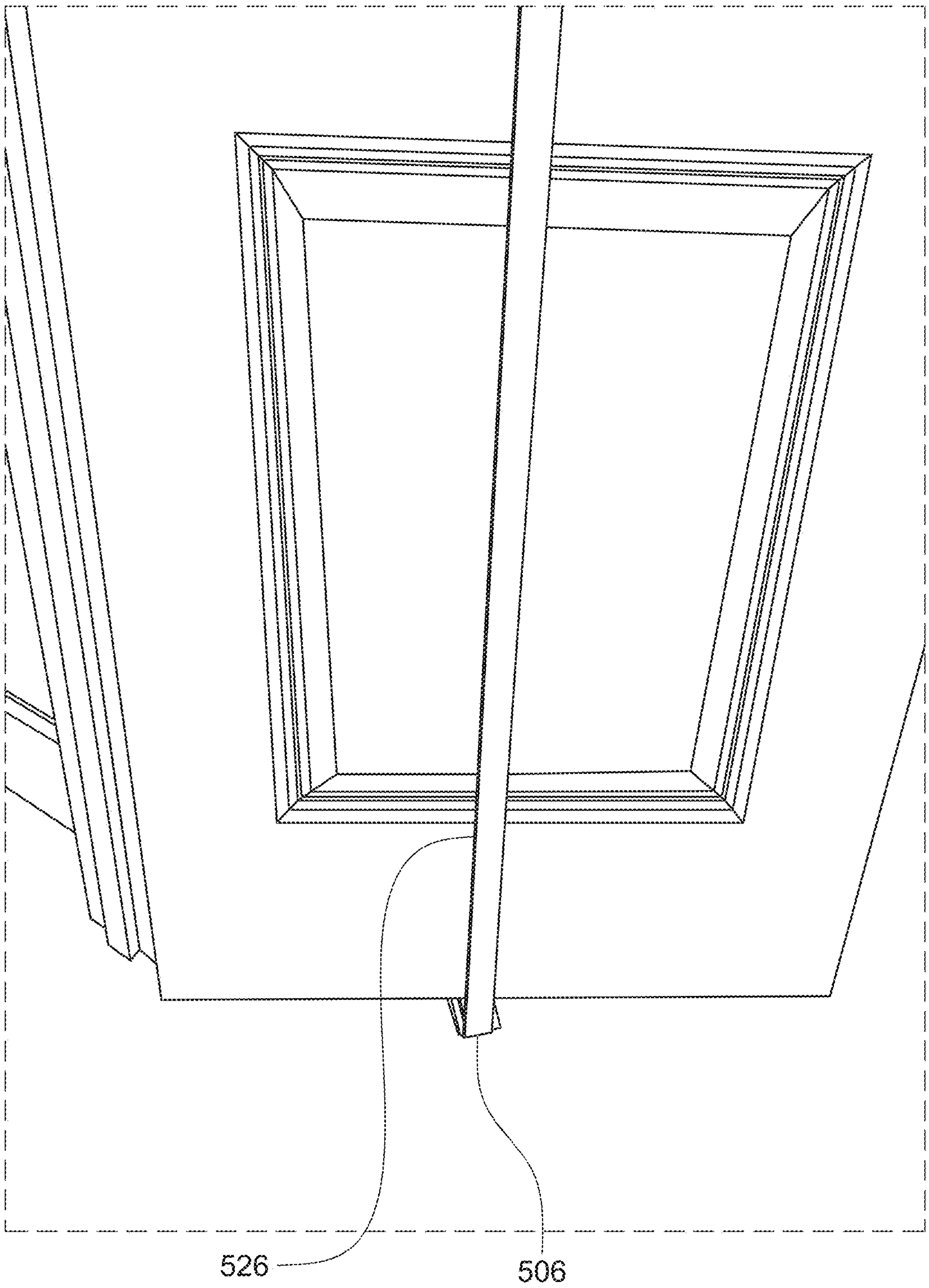
FIG. 5C illustrates another view of one embodiment of an adjustable anchor strap.
Figure 5D:
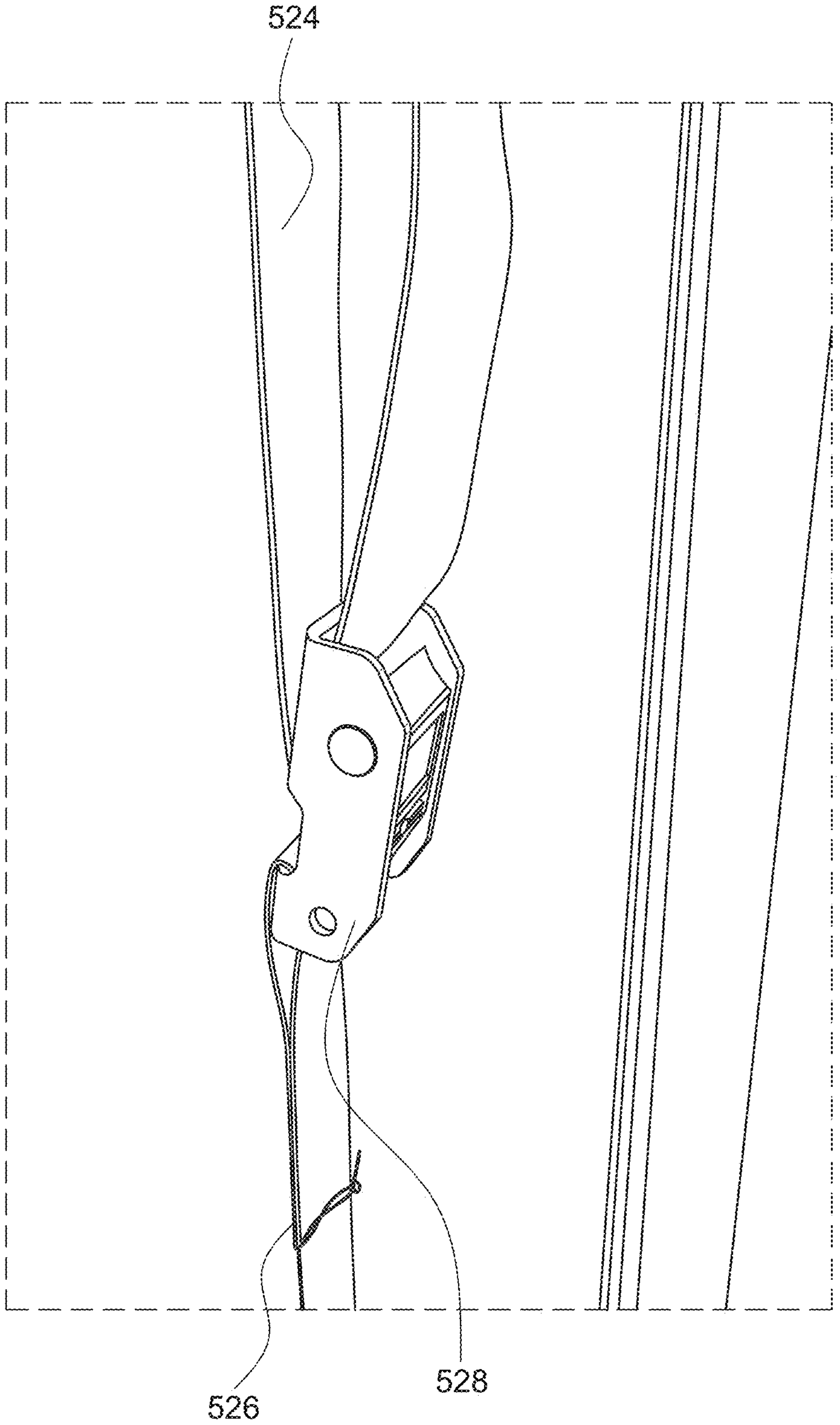
FIG. 5D illustrates a length adjustment mechanism in more detail.

FIG. 5A illustrates a front view of another embodiment of a spinal decompression device 500 mounted to a door 502. FIG. 5B illustrates a first portion of one embodiment of an anchor strap, FIG. 5C illustrates a second portion of one embodiment of an anchor strap and FIG. 5D illustrates one embodiment of a length adjustment mechanism.

Spinal decompression device 500 comprises an anchor portion, a working portion, and a load measuring device. The anchor portion comprises an anchor strap 504 coupled at one end to an anchor 506 and to linking member 508 at the distal end from anchor 506. In this embodiment, anchor strap 504 is adapted to fit between the door and the door frame. As illustrated in FIG. 5C, anchor strap 504 runs down the back of the door to connect to anchor 506 at the base of the door. In the illustrated embodiment, anchor 506 is a door wedge wedged in from the front of the door and used to support the door. In other embodiments, the anchor portion may be used to anchor the spinal decompression device to a pull up bar, a wall or ceiling mounted bracket or other mechanical ground.

The working portion includes a horizontal crossbar 512 from which a pair of arm supports 520*a*, 520*b* are suspended. In the illustrated embodiment, arm supports 520*a*, 520*b* comprise working straps 521*a*, 521*b* that extend from crossbar 512 to the working end portions of the working straps 521*a*, 521*b*. While working straps 521*a*, 521*b* are illustrated as fixed length working straps, the working straps in some embodiments are adjustable length working straps.

The working end portions of arm supports 520*a*, 520*b* are adapted to support a user's arms during treatment. More particularly, the working end portions of the arm supports may comprise slings, cuffs, handles, or other mechanisms such that the arm supports can lift the user's arms from the upper arms, forearms, wrists, or hands. In the illustrated embodiment, the working end portions comprise arm slings 522*a*, 522*b* adapted to receive and support the user's upper arms.

The working portion of spinal decompression device 500 is operatively coupled to anchor strap 504 such that there is a load path from arm supports 520*a*, 520*b* to anchor strap 504. A load cell is disposed in the load path. For example, anchor strap 504 is coupled to linking member 508, which extends into crossbar 512. Linking member 508 and crossbar 512 are coupled to a load cell of load measuring device 510, which, in some embodiments, operates similarly to the load measuring devices discussed above.

According to one embodiment, height adjustment is achieved using an adjustable length anchor strap 504. For example, anchor strap 504 comprises an upper strap 524 and a lower strap 526 joined at a buckle 528 that allows the overall length of anchor strap 504 to be lengthened or shortened. By changing the length of anchor strap 504, crossbar 512 is raised or lowered, thus raising or lowering the positions of arm slings 522*a*, 522*b*. An adjustable length anchor strap may be used in the alternative to or in addition to adjustable length working straps or other height adjustment mechanisms. While the anchor strap length adjustment mechanism is depicted as a buckle 528 in FIG. 5B-FIG. 5D, anchor strap 504 may include any suitable length adjustment mechanism.

Figure 6A:
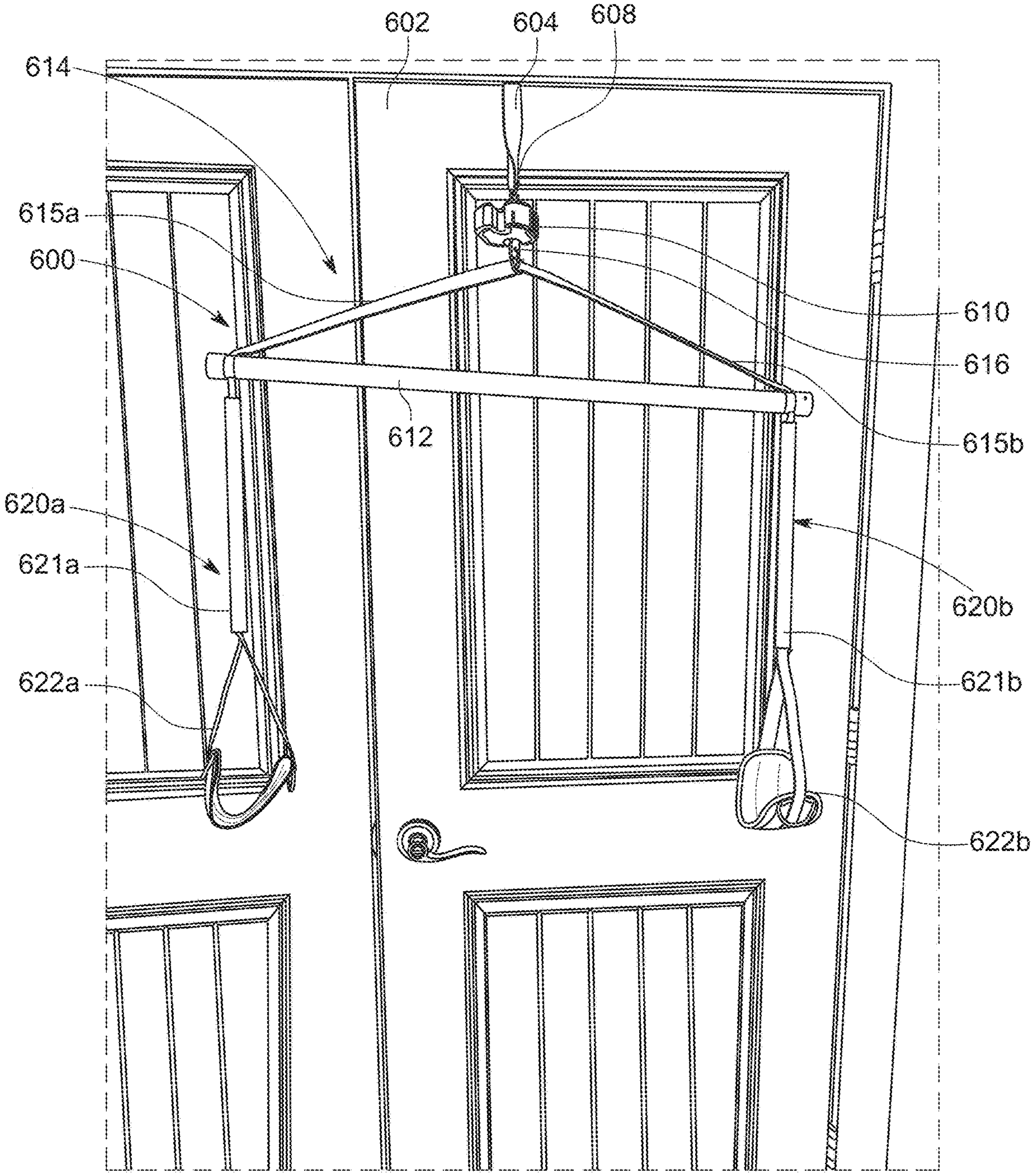
FIG. 6A illustrates another embodiment of a spinal decompression system.
Figure 6B:
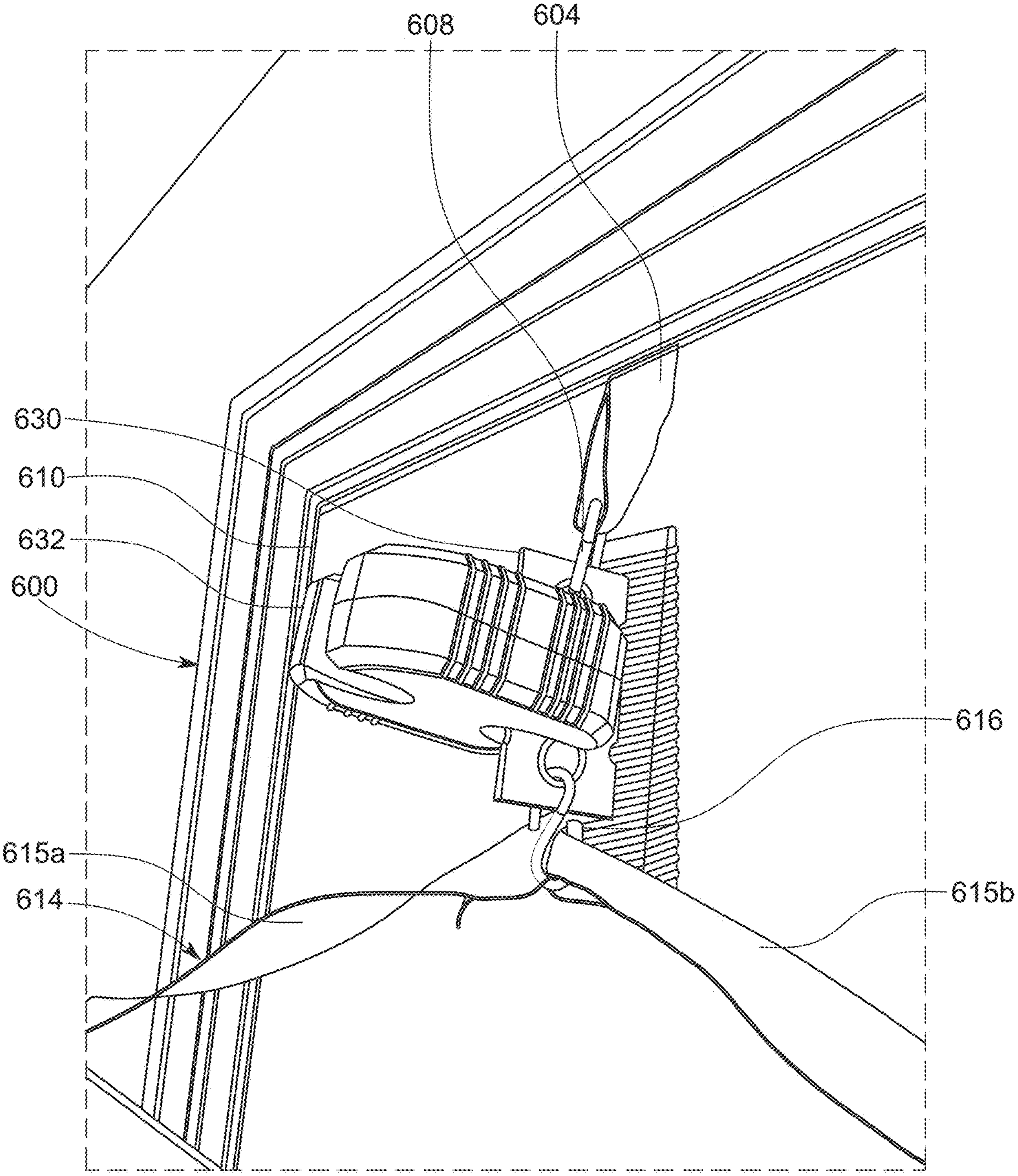
FIG. 6B illustrates one embodiment of a load measuring portion of a spinal decompression system in more detail.

FIG. 6A illustrates a front view of another embodiment of a spinal decompression device 600 mounted to a door 602. FIG. 6B illustrates one embodiment of load measuring device in more detail.

Spinal decompression device 600 comprises an anchor portion, a working portion, and a load measuring device. The anchor portion comprises an anchor strap 604 that is adapted to fit between the door and door frame. According to one embodiment, anchor strap 604 is an adjustable length anchor strap that is adjustable to raise and lower crossbar 612 and hence the arm supports. Anchor strap 604 is coupled at one end to an anchor, such as a door wedge or other anchor, and to linking member 608 at the distal end from the anchor. In other embodiments, the anchor portion may be used to anchor the spinal decompression device to a pull up bar, a wall or ceiling mounted bracket or another mechanical ground.

The working portion includes a horizontal crossbar 612 from which a pair of arm supports 620*a*, 620*b* are suspended. In the illustrated embodiment, arm supports 620*a*, 620*b* comprise working straps 621*a*, 621*b* that extend from crossbar 612 to the working end portions of the working straps 621*a*, 621*b*. While working straps 621*a*, 621*b* are illustrated as fixed length working straps, the working straps in some embodiments are adjustable length working straps.

The working end portions of arm supports 620*a*, 620*b* are adapted to support a user's arms during treatment. More particularly, the working end portions of the arm supports may comprise slings, cuffs, handles, or other mechanisms such that the arm supports can lift the user's arms from the upper arms, forearms, wrists, or hands. In the illustrated embodiment, the working end portions comprise arm slings 622*a*, 622*b* adapted to receive and support the user's upper arms.

The working portion of spinal decompression device 600 is operatively coupled to anchor strap 604 such that there is a load path from arm supports 620*a*, 620*b* to anchor strap 604. More particularly, crossbar 612 is suspended by a harness 614, which is coupled to a load cell 630 (FIG. 6B) of load measuring device 610 by linking member 616. Anchor strap 604 is coupled to load cell 630 by linking member 608.

One embodiment of harness 614 comprises a first strap 615*a* that connects between linking member 616 and a first location along crossbar 612 and a second strap 615*b* that connects between linking member 616 and a second location along crossbar 612, where the first location and second location are horizontally spaced apart. In some embodiments, a single harness strap acts as first strap 615*a* and second strap 615*b*. While the harness straps are illustrated as fixed length harness straps, other embodiments can use adjustable length harness straps to raise and lower crossbar 612.

Turning to FIG. 6B, one embodiment of a load measuring device 610 is illustrated in more detail. Load measuring device 610 comprises a load cell 630 and a controller 632. Anchor strap 604 is coupled to load cell 630 by linking member 608 and harness 614 is coupled to load cell 630 by linking member 616. As load is applied to crossbar 612 by the arm supports, crossbar 612 displaces from an unladen position (the position when a user's arms are not being supported) to a laden position and the load cell 630 deforms. Strain gauges of the load cell output an electrical signal corresponding to the load applied by harness 614 to the load cell. Controller 632 processes the signal to output an unloading load on a display. In some embodiments, load measuring device 410 zeros-out the weight of the crossbar, arm supports and other loads that are present when the arm supports are unladen so that these loads are not included in the indicated unloading load.

Figure 7:
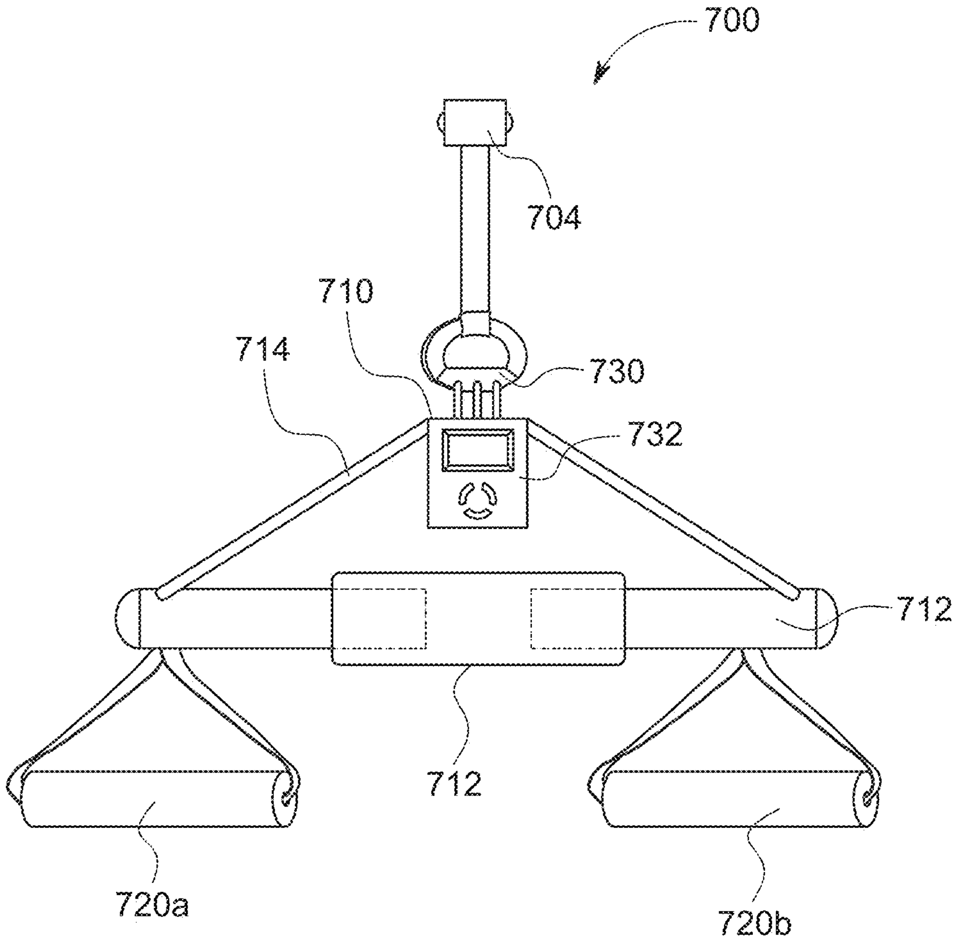
FIG. 7 is a diagrammatic representation of another embodiment of a spinal decompression system.

FIG. 7 illustrates a front view of another embodiment of a spinal decompression device 700. Spinal decompression device 700 comprises an anchor portion, a working portion, and a load measuring device. The anchor portion comprises an anchor strap 704 that is adapted to fit between a door and door frame. Anchor strap 704 couples at one end to an anchor, such as a door wedge or other anchor. According to one embodiment, anchor strap 704 is an adjustable length anchor strap that is adjustable to raise and lower crossbar 712 and hence the arm supports. In other embodiments, the anchor portion may be used to anchor the spinal decompression device to a pull up bar, a wall or ceiling mounted bracket or another mechanical ground.

The working portion includes a horizontal crossbar 712 from which a pair of arm supports 720*a*, 720*b* are suspended. In the illustrated embodiment, arm supports 720*a*, 720*b* comprise working end portions connected to crossbar 712 without an intermediate working strap. The working end portions of arm supports 720*a*, 720*b* are adapted to support a user's arms during treatment. More particularly, the working end portions of the arm supports may comprise slings, cuffs, handles, or other mechanisms such that the arm supports can lift the user's arms from the upper arms, forearms, wrists, or hands. In the illustrated embodiment, the working end portions comprise handles adapted to lift the user's arms by the user's hands during treatment.

The working portion of spinal decompression device 700 is operatively coupled to anchor strap 704 such that there is a load path from arm supports 720*a*, 720*b* to anchor strap 704. More particularly, crossbar 712 is supported by a harness 714, which is coupled to a load cell 730 of load measuring device 710 by a linking member (not shown). The harness arrangement, in some embodiments, is similar to that discussed in conjunction with FIG. 6A and FIG. 6B. While the harness straps are illustrated as fixed length harness straps, other embodiments can use adjustable length harness straps to raise and lower crossbar 712. Anchor strap 704 is also coupled to load cell 730.

Load measuring device 710 comprises a load cell 730 and a controller 732. As load is applied to crossbar 712 by the arm supports, crossbar 712 displaces from an unladen position (the position when a user's arms are not being supported) to a laden position and the load cell 730 deforms. Strain gauges of the load cell output an electrical signal corresponding to the load applied by harness 714 to the load cell. Controller 732 processes the signal to output an unloading load on a display. In some embodiments, load measuring device 710 zeros-out the weight of the crossbar, arm supports and other loads that are present when the arm supports are unladen so that these loads are not included in the indicated unloading load.

Spinal decompression device 700 is similar to spinal decompression device 600 except that the working end portions of the arm supports are close to crossbar 712. As such, the display of controller 732 will be closer to the user being treated during use, increasing ease of use. The height of the arm supports 720*a*, 720*b* can be adjusted by adjusting the length of anchor strap 704.

In one embodiment of operation, a spinal decompression device is anchored to a mechanical ground and set up for use. The load measuring device is zeroed out to account for loads detected when the spinal decompression device is unladen. Further, an unloading load is determined for a user (e.g., a patient). According to one embodiment, an unloading load is determined as 10-30% of the user's body weight, though other unloading loads may be used. Using 25%, this would result in an unloading load of 40 lbs. (20 lbs. per arm) for a 160 lbs. person.

According to one embodiment, the patient stands facing the spinal decompression device (e.g., facing the door) and arranges their arms to supported by the spinal decompression device. For example, the user places their arms out to the side to be supported by the slings (e.g., slings 122*a*, 122*b*, slings 422*a*, 422*b*, slings 522*a*, 522*b*, slings 622*a*, 622*b*) or grasps the handles (e.g., the handles of arm supports 720*a*, 720*b*). The user being treated then slowly sits down on a chair or stool with their arms supported to their sides by the slings or lifted by the handles. With the user comfortably seated, the user can relax and allow their upper body to hang loosely with their arms lifted by the arm supports. The load measuring device measures the load to support the user's arms. According to one embodiment, a user (e.g., the user being treated or a user providing a treatment service) adjusts the height of the arm supports is adjusted to achieve the desired unloading load. By way of example, but not limitation, the lengths of the working straps, harness, or anchor strap can be iteratively adjusted to adjust the load until the correct unloading load is detected by the load measuring device. The user being treated remains in this position for a prescribed period of time, say four minutes, or other period of time.

It will be appreciated that an unloading load of 10%-30% of body weight is provided as a nonlimiting example. In other cases, a user can be treated using lower or higher unloading loads. For example, some embodiments of spinal decompression devices discussed herein can be used to provide sustained unloading forces of 40% or even in excess of 50% body weight, depending on circumstances. Moreover, treatment sessions can be shorter or longer than 4 minutes.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the invention.

What is claimed is:

1. A spinal decompression system comprising:

an anchor portion to anchor the spinal decompression system to a mechanical ground, the anchor portion comprising:

an anchor; and an anchor strap coupled to the anchor;

a pair of arm supports to support a user's arms in a raised position; and a load path from the pair of arm supports to the anchor strap, the load path comprising:
a crossbar operatively coupled to the anchor strap, wherein the pair of arm supports are coupled to the crossbar at spaced apart locations; and
a load cell disposed in the load path to sense an applied load applied by the pair of arm supports to the user's arms, wherein the pair of arm supports have an adjustable height to adjust the applied load.

2. The spinal decompression system of claim 1, wherein each of the pair of arm supports comprises a working strap coupled to a working end portion, wherein the working end portion of each of the pair of arm supports is adapted to support a respective arm.

3. The spinal decompression system of claim 2, wherein the anchor strap has an adjustable length that is adjustable to adjust a height of the pair of arm supports.

4. The spinal decompression system of claim 2, wherein the working strap of each of the pair of arm supports comprises an adjustable length working strap that is adjustable to adjust a height of the working end portion of the respective arm support.

5. The spinal decompression system of claim 1, wherein the spinal decompression system is door mountable.

6. The spinal decompression system of claim 5, wherein the anchor comprises a door wedge to support the door and wherein the anchor strap runs from the door wedge to a door top and passes between the door top and a door frame.

7. The spinal decompression system of claim 1, further comprising a harness to suspend the crossbar, wherein the harness is coupled between the crossbar and the load cell.

8. The spinal decompression system of claim 7, wherein the harness is adjustable to adjust a height of the arm supports.

9. The spinal decompression system of claim 1, wherein each of the pair of arm supports comprises an arm sling, a cuff, or a handle.

10. The spinal decompressions system of claim 1, wherein the load cell is a bending beam load cell disposed in an interior of the crossbar, and wherein the anchor strap is coupled to the bending beam load cell.

11. The spinal decompression system of claim 1, further comprising a controller coupled to the load cell, wherein the controller is configured to convert a signal output by the load cell to an indication of an unloading load applied by the spinal decompression system on the user's arms.

12. A method for spinal decompression comprising:
anchoring a spinal decompression system to a mechanical ground, the spinal decompression system comprising:
an anchor; and
an anchor strap coupled to the anchor;
a pair of arm supports to support a user's arms in a raised position; and
a load path from the pair of arm supports to the anchor strap, wherein the load path comprises:
a crossbar from which the pair of arm supports are suspended; and
a load cell disposed in the load path to sense an applied load applied to the user's arms;
supporting the user's arms using the pair of arm supports;
adjusting the spinal decompression system to apply a selected unloading load to the user's arms, the selected unloading load selected facilitate spinal decompression; and
performing a spinal decompression session, comprising continuing to support the user's arms using the selected unloading load for a prescribed period of time.

13. The method for spinal decompression of claim 12, wherein the selected unloading load is 10%-30% of the user's body weight.

14. The method for spinal decompression of claim 12, further comprising converting a signal output by the load cell to an applied unloading load and outputting an indication of the applied unloading load, wherein adjusting the spinal decompression system to apply the selected unloading load to the user's arms comprises adjusting the spinal decompression system so that the indication of the applied unloading load indicates the selected unloading load.

* * * * *